July 8, 1941.   J. H. WALBORN   2,248,291
METHOD OF CUTTING PRETZEL STICKS
Original Filed Nov. 3, 1939    3 Sheets-Sheet 1
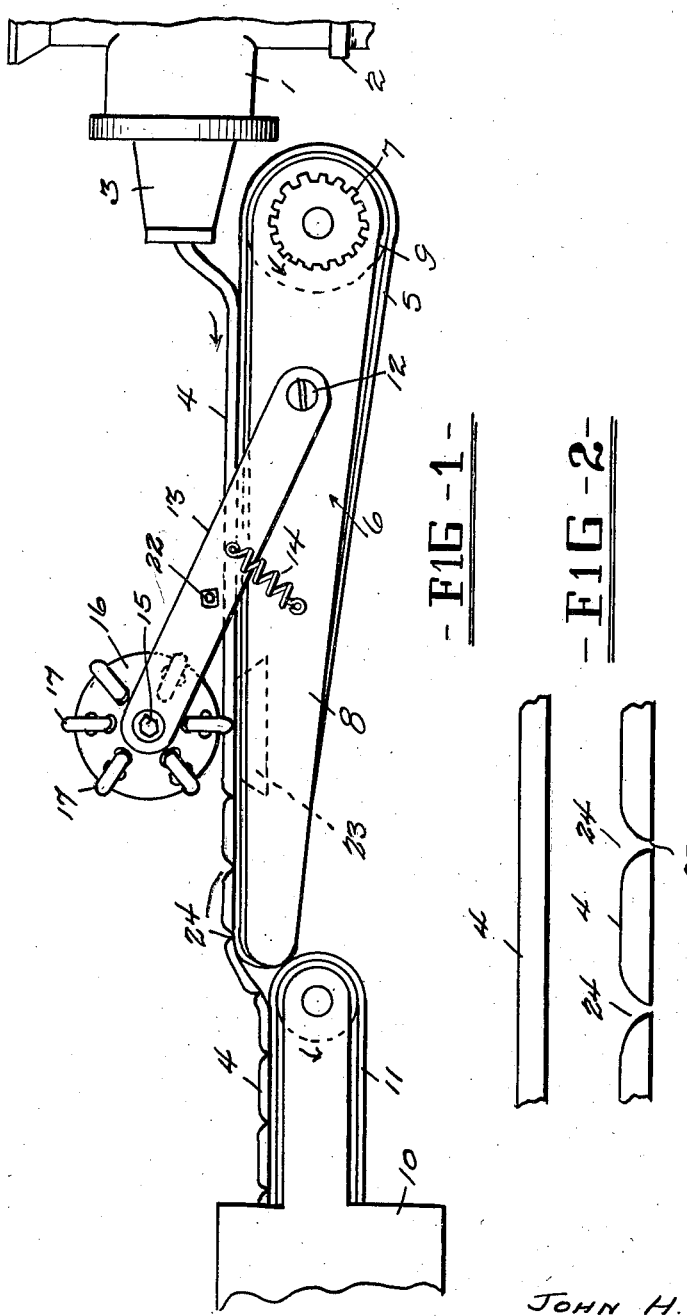
Inventor
JOHN H. WALBORN
By
Attorney July 8, 1941.  J. H. WALBORN  2,248,291
METHOD OF CUTTING PRETZEL STICKS
Original Filed Nov. 3, 1939   3 Sheets-Sheet 2

Inventor
JOHN H. WALBORN
By
Attorney

July 8, 1941.　　J. H. WALBORN　　2,248,291
METHOD OF CUTTING PRETZEL STICKS
Original Filed Nov. 3, 1939　　3 Sheets-Sheet 3
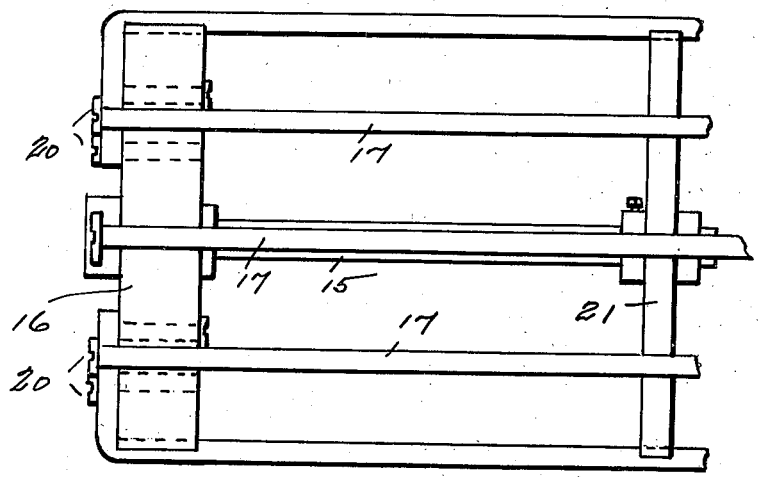
FIG-5-
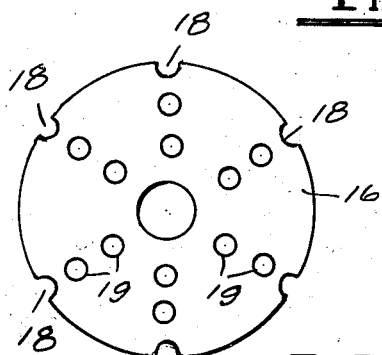
-FIG-7-
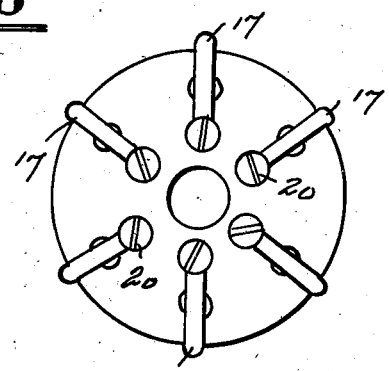
-FIG-6-
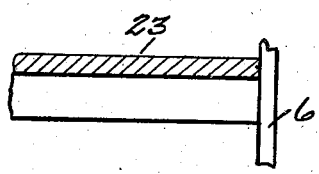
-FIG-8-
Inventor
JOHN H. WALBORN,
By
Attorney Patented July 8, 1941

2,248,291

UNITED STATES PATENT OFFICE 2,248,291

METHOD OF CUTTING PRETZEL STICKS

John H. Walborn, Harrisburg, Pa.

Original application November 3, 1939, Serial No. 302,786. Divided and this application March 8, 1940, Serial No. 323,011

2 Claims. (Cl. 107—54)

My present invention is a division of my pending application for patent on Pretzel stick cutters, Serial #302,786, filed November 3, 1939, and issued February 25, 1941, as Patent No. 2,232,832, and in its broad aspect has to do with the method of forming and cutting what are known as pretzel sticks, and more particularly it is my purpose to provide a method whereby pretzel sticks may be cut without ragged, pressed, or mutilated ends whereby the texture of the dough or finished pretzel stick is not such as will permit ingress of air, moisture or other undesirable features which are very detrimental to freshness and preservation, especially under the influence of high humidity, and when stored for any lengthy period of time. In this connection it may be stated that where pretzels are formed from dough strips which pass beneath a cutting member of the knife type, either revolving or reciprocating or the like, there is a tendency for the moving dough strips to "back up" against or be impeded in their progress by the cutter as it operates to cut the dough strips into lengths desirable for pretzel sticks. This is disadvantageous and affects the texture of the dough at the cut end of the pretzel stick and is otherwise undesirable. My present invention eliminates this undesirable feature. In my present method, lumps of dough are deposited in conventional stick or strip forming machines which process the dough to form a plurality of continuous strips or strings which are picked up by a conveyor belt as they leave the stick forming machines. Ordinarily the conveyor belt carries the continuous strips or strings as they are formed by the stick forming machine forward to a wire mesh conveyor belt which is an operating part of the pretzel oven or baker. That is, the dough strips or strings are carried through the oven or cooker and are converted into baked pretzel sticks. During this process the dough strips pass through a scalding solution which gives the golden color when completed or baked, and they are also sprinkled with salt. As a process in the baking or cooking operation they are conveyed by the wire mesh conveyor belt to oven conveyor plates which move at the proper speed in relation to the heat to properly bake them. As they leave the oven they are almost hard enough to be brittle, and it is at this stage that a rotating shear ordinarily cuts the sticks to the desired lengths. However, the action of the rotating shear on the brittle pretzel at this stage in its formation ordinarily produces a ragged end— sufficient to admit air circulation, moisture and the like which is very undesirable and detrimental to the freshness of the sticks, especially when the sticks are stored for any long period of time or exposed to a humid atmosphere. My invention relates to improvements in the aforementioned means and methods of producing pretzel sticks and eliminates the disadvantages thereof.

My present invention contemplates cutting the dough strips without permitting dough to "back up" against the cutting element as the strips follow through their continuous path to the cooker and baker, and in cutting the dough strips before they enter the oven, and preferably while they are being carried forward by the canvas belt conveyor. To accomplish this end, I provide a revolving drum cutter whose only contact with the dough strips or strings is through a series of spaced, fine steel wires, which do not cause backing up of the dough, and which are arranged on supporting disks to contact the dough strips or strings as they pass thereunder on the canvas belt conveyor to press down or squeeze the area of dough at the point to be cut, so that when the cut is completed the ends are sealed; the texture not open to ingress of air and moisture, and there is no bunching or backing up of dough. The series of pretzel sticks so formed have even and finished cut ends and are not subject to deterioration or humid atmospheric conditions.

My present method may be briefly described as carried out on an apparatus consisting of a pair of arms forming a bearing for an axle supported above the canvas conveyor belt and on which are carried discs supporting a plurality of fine steel wires for cutting the dough pretzel strips or strings. Intermediate discs (adjustable on the axle) are provided to sustain the wires in proper position, and suitable tensioning devices are provided both for the wires and the arms, while both the depth of the action of the wires on the dough strips or strings and the spacing of the wires is adjustable, i. e. determined by the setting of the wires.

Other and equally important objects and advantages of my invention will be apparent as the description of its several parts proceeds, but it is emphasized that interpretation of the scope of the invention should only be conclusive when made in the light of the subjoined claims.

In the drawings wherein I have shown the apparatus whereby my method of cutting pretzels is carried out—

Figure 1 is a side elevation of my invention;

Figure 2 is a section or fragment of pretzel dough strip before cutting;

Figure 3 is a section or fragment of pretzel dough strip after cutting and broadly shows the shape and formation of the ends of the stick sections;

Figure 5 is a fragmentary view of one end of my cutting drum in side elevation;

Figure 6 is an end view of the same;

Figure 7 is a view of one of my wire drums or discs for supporting the wires, and with the wires removed, and Figure 8 is a detail of the bracket or table for supporting the portion of the canvas belt conveyor beneath the drum.

In the drawings wherein like characters of reference are used to illustrate like or similar parts throughout the several views, and wherein the application of my method is illustrated—

Figure 4:
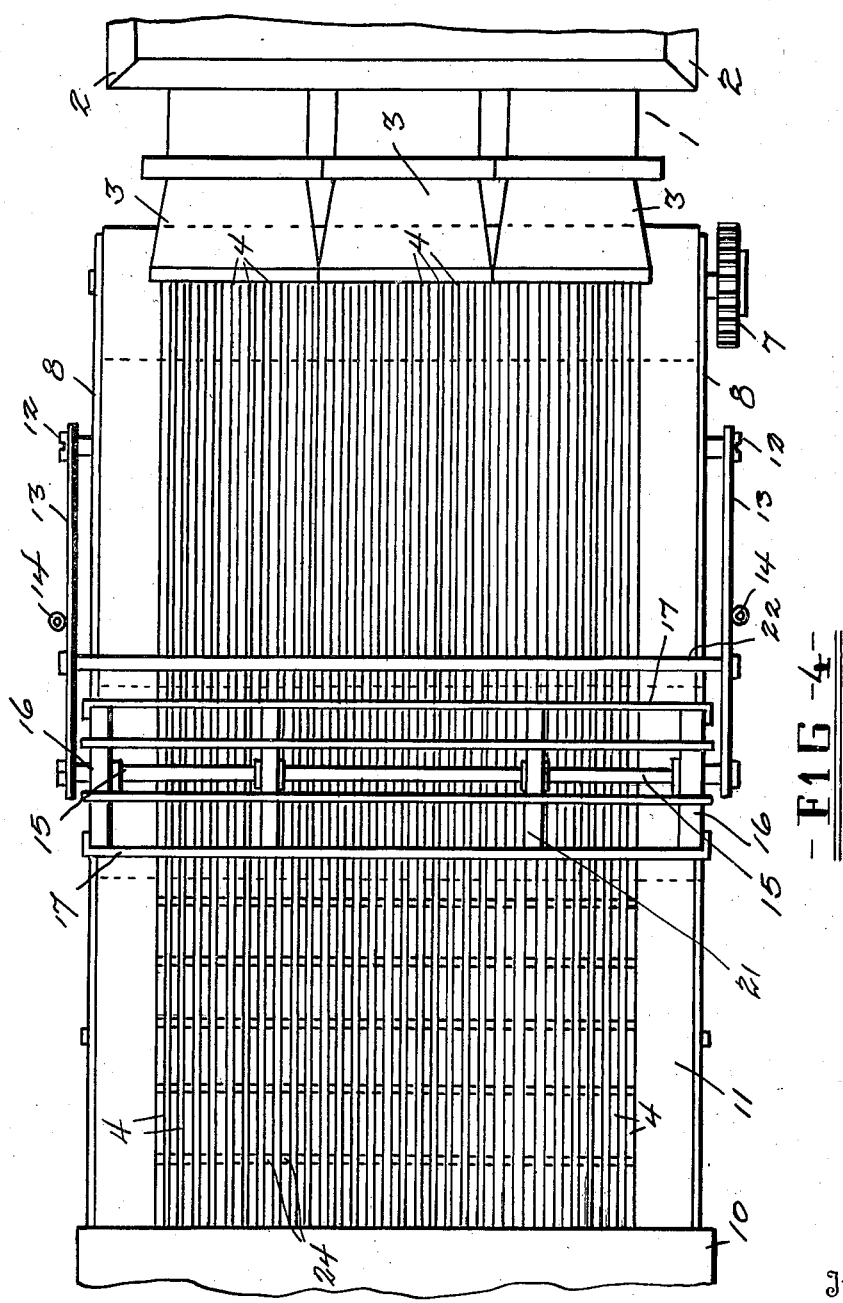
Figure 4 is a top plan view of the apparatus for carrying out my method.

The numeral 1 shows a conventional pretzel stick machine having hoppers 2 and a series of dough strip or string outlets 3 from which issue continuous strips or strings of pretzel dough 4. These strings or strips are deposited on an endless canvas belt conveyor 5 carried on the frame 6 and receiving power through the gear 7 connected with a suitable prime mover (not shown). The frame has side rails 8 and the belt is carried on the usual rollers 9. There is provided a conventional pretzel baker or oven 10 having as an operative part thereof a wire screen conveyor 11 which is designed to receive the strips or strings of dough 4 from the canvas belt conveyor 5 as shown in Figures 1 and 4. Pivotally mounted as at 12 to the side rails 8 of the frame 6 are arms 13, each being normally urged downwardly by a spring 14 in addition to the force of gravity. Journalled in the free ends of the arms 13 is an axle 15 carrying end discs 16 on which are strung fine steel wires or cutters 17; there being suitable notches 18 in the peripheries of the discs to receive the wires. The wires are adjustably retained in openings 19 in the discs by cap screws 20. The wires contact the canvas conveyor belt and the dough strips or strings 4 and as the belt moves forward the drum formed by the axle, discs and wires is rotated to cut the strips or strings. In other words the drum is free moving and is carried forward by contact with the strips or strings, and it is therefore impossible for dough to "back up" or bunch up back of the cutter thereby ruining its texture; mutilating the cut end and the like. The action on the strips or strings is determined by the adjustment of the wires, and the length of the resulting pretzel stick is determined by the spacing of the wires on the discs. In order to hold the wires properly in place throughout their length, lighter discs 21 are provided which are mounted for adjustment lengthwise of the axle. The two arms 13 are connected by a reinforcing rod 22 back of the drum so that they maintain proper positions and operate in unison. Beneath the canvas conveyor belt and carried by the side rails 8 is a bracket or table 23 which is arranged beneath the drum to hold the conveyor belt in proper position and provide proper resistance to the action of the cutting wires. When cut the strips pass to the wire screen conveyor 11 and thence to the oven or baker 10 as shown in Figures 1 and 4.

The method by which I attain the ends enumerated and others consists, (1) of forming the dough strips or strings, (2) moving the strips or strings along continuously toward an oven or baker, (3) cutting said strips or strings by means of a free moving (or idling) rotary cutter having steel wire cutting elements arranged in predetermined spaced relationship about a circular drum frame, and contacting the dough strips to cut the same, (4) passing said cut strips to a screen wire conveyor, (5) cooking and baking said cut strips or pretzel sticks. The principal objects of my invention and those accomplished by my method are the formation of pressed or slightly squeezed ends with the context or structure of the dough unbroken and of uniform shape, form, and fully closed to air and moisture and other deleterious atmospheric or other conditions. At the same time "backing up" or "bunching" of the dough back of the cut ends is eliminated thus insuring the uniform, and desirable structure of the ends. Changes in form, size, shape, arrangement and construction of moving parts may be varied under the dictates of practice and provided the unique concept of my invention and its application and method are adhered to, and provided such changes come within the purview of the appended claims.

I claim:

1. The method of forming pretzel sticks without appreciably distorting or modifying the condition of the dough existing prior to the formation of the sticks, consisting in forming strips of dough and moving said strips along a predetermined path, and gradually exerting pressure thereon at predetermined intervals at an angle to the direction of movement of the strips of dough, application of said pressure being controlled by movement of the strips of dough along the predetermined path whereby said strips are severed into predetermined lengths or sticks without development of pressure or forces thereon of sufficient intensity to distort or modify the condition of the dough in the strips or sticks.

2. The method of forming pretzel sticks without appreciably distorting or modifying the condition of the dough existing prior to the formation of the sticks, consisting in forming strips of dough and positively moving said strips along a predetermined path, and gradually exerting pressure thereon substantially at right angles to the direction of movement of the strips and at intervals and wholly controlled by the movement of the strips of dough whereby said strips are severed into predetermined lengths or sticks without development of pressure or forces thereon of sufficient intensity to distort or modify the condition of the dough in the strips or sticks.

J. H. WALBORN.